United States Patent
Chiu et al.

(10) Patent No.: US 9,530,379 B2
(45) Date of Patent: Dec. 27, 2016

(54) POWER CONVERTERS AND E-PAPER DEVICES USING THE SAME FOR PROVIDING A PLURALITY OF VOLTAGES

(71) Applicant: Delta Electronics, Inc., Taoyuan Hsien (TW)

(72) Inventors: Ming-Chih Chiu, Taoyuan Hsien (TW); Wen-Bin Liu, Taoyuan Hsien (TW); Ron Hsu, Taoyuan Hsien (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 14/103,153

(22) Filed: Dec. 11, 2013

(65) Prior Publication Data

US 2014/0098081 A1 Apr. 10, 2014

Related U.S. Application Data (62) Division of application No. 12/902,694, filed on Oct. 12, 2010, now abandoned.

(60) Provisional application No. 61/250,304, filed on Oct. 9, 2009.

(51) Int. Cl.
| | |
|---|---|
| G09G 3/34 | (2006.01) |
| H02M 3/335 | (2006.01) |
| G09G 5/00 | (2006.01) |
| G09G 3/36 | (2006.01) |

(52) U.S. Cl.
CPC .............. *G09G 5/00* (2013.01); *G09G 3/3433* (2013.01); *G09G 3/3696* (2013.01); *H02M 3/33561* (2013.01); *G09G 2330/021* (2013.01); *G09G 2380/14* (2013.01); *Y10T 307/297* (2015.04)

(58) Field of Classification Search
CPC ............ G09G 2330/021; G09G 3/3433; G09G 3/3696; H02M 3/33507; H02M 3/33561
USPC ............................. 345/211; 363/21.12, 21.18
See application file for complete search history.

(56) References Cited

U.S. PATENT DOCUMENTS

| | | | |
|---|---|---|---|
| 4,999,759 A | 3/1991 | Cavagnolo et al. | |
| 7,276,861 B1* | 10/2007 | Shteynberg et al. | 315/291 |
| 2002/0122326 A1* | 9/2002 | Chen et al. | 363/97 |
| 2004/0257838 A1* | 12/2004 | Gan et al. | 363/21.06 |
| 2008/0062726 A1 | 3/2008 | Peng et al. | |
| 2008/0088248 A1* | 4/2008 | Myers | 315/210 |

* cited by examiner

*Primary Examiner* — Jonathan Blancha
*Assistant Examiner* — John Kirkpatrick
(74) *Attorney, Agent, or Firm* — Muncy, Geissler, Olds & Lowe, P.C.

(57) ABSTRACT

A display device including an e-paper device and a power converter is provided. The e-paper device displays information. The power converter generates a plurality of output voltages respectively at a plurality of output terminals and provides the plurality of output voltages to the e-paper device. The power converter includes a transformer and a plurality of diodes. The transformer has a primary winding and a plurality of secondary windings. The diodes are electrically connected between the secondary windings and the output terminals for generating the output voltages, respectively.

10 Claims, 9 Drawing Sheets

POWER CONVERTERS AND E-PAPER DEVICES USING THE SAME FOR PROVIDING A PLURALITY OF VOLTAGES

CROSS REFERENCE TO RELATED APPLICATIONS

The present application is a divisional application of and claims priority from U.S. patent application Ser. No. 12/902,694, filed Oct. 12, 2010, the content of which is hereby incorporated by reference in its entirety.

BACKGROUND OF THE INVENTION

Field of the Invention

The invention relates to a power converter providing a plurality of output voltages, and more particularly to an e-paper device which uses a power converter providing a plurality of output voltages.

Description of the Related Art

Figure 1:
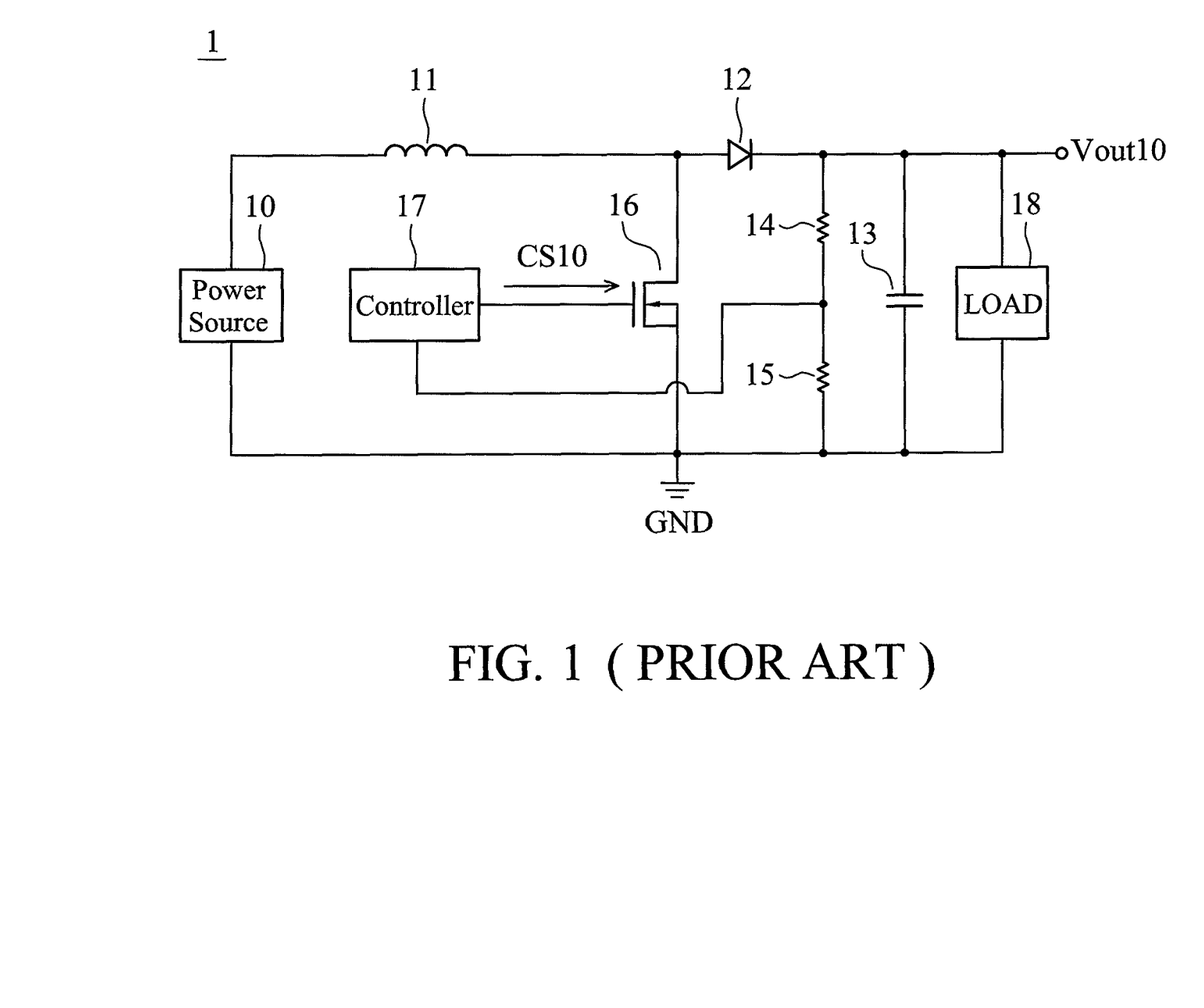
FIG. 1 shows a conventional boost power converter.

FIG. 1 shows a conventional boost power converter 1. The boost power converter 1 includes a power source 10, an inductor 11, a diode 12, a capacitor 13, resistors 14 and 15, a high power switch 16, and a controller 17 and provides an output voltage Vout10. The controller 17 generates a control signal CS10 to control the high power switch 16 to be turned on and off periodically. When the high power switch 16 is turned on according to the control signal CS10, the power source 10, the inductor 11, and the high power switch 16 form a loop. The inductor 11 stores energy by a current flowing through the loop. When the high power switch 16 is turned off according to the control signal CS10, the inductor 14 releases the stored energy. At this time, an inductor current is generated and flows to a load 18 through the diode 12. Accordingly, the output voltage Vout10 is generated. In the boost power converter 1, since the voltage across the two terminals of the high power switch 16 is vary high (being higher or equal to the output voltage Vout10) the high power switch 16 is turned off, switch loss of the high power switch 16 is high. Moreover, the high power switch 16 has to be a high voltage element to suffer the high voltage.

Figure 2:
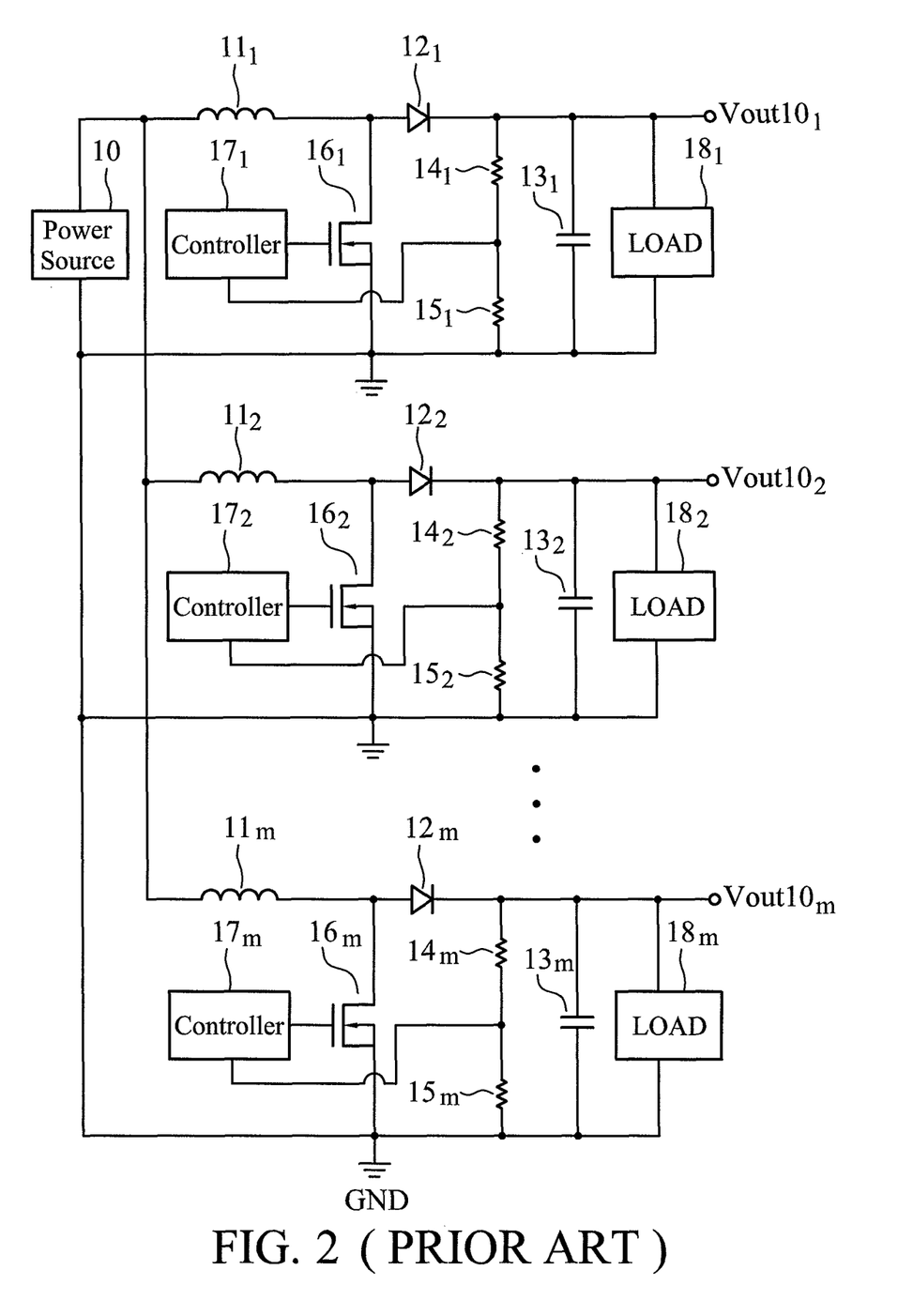
FIG. 2 shows a conventional power converter for driving an e-paper device which is implemented by a plurality of the boost power converters of FIG. 1.

Recently, e-paper devices have been developed. Since power consumption of e-paper devices is very low, e-paper devices can be applied in mobile display devices using batteries. Power converters which drive e-paper devices are requested to have high voltage, low current, and high conversion efficiency characteristics and are requested to provide multiple output voltages. Thus, to achieve the objective of providing multi output voltages by the boost power converters, a power converter having a plurality of boost power converters 1, as shown in FIG. 2, has been developed for driving an e-paper device. Referring to FIG. 2, a power converter provides a plurality of output voltages $Vout10_1$~$Vout10_m$ by using a plurality of boost power converters, wherein m is a positive integer. The boost power converters share one power source 10. Each boost power converter includes an inductor $11_X$, a diode $12_X$, a capacitor $13_X$, resistors $14_X$ and $15_X$, a high power switch $16_X$, and a controller $17_X$ with the similar structure to FIG. 1 and provides an output voltage $Vout10_X$, wherein $1 \leq X \leq m$. However, the power converter having the boost power converters occupies a large area. Moreover, since the number of high power switches $16_1$~$16_m$ is increased with the number of the output voltages $Vout10_1$~$Vout10_m$, the total power loss due to the high power switches $16_1$~$16_m$ and the controllers $17_1$~$17_m$ is also increased, resulting in degradation of entire work efficiency.

Thus, it is desired to provide a power converter which provides a plurality of output voltages and has high work efficiency.

BRIEF SUMMARY OF THE INVENTION

An exemplary embodiment of a display device includes an e-paper device and a power converter. The e-paper device displays information. The power converter generates a plurality of output voltages respectively at a plurality of output terminals and provides the plurality of output voltages to the e-paper device. The power converter includes a transformer and a plurality of diodes. The transformer has a primary winding and a plurality of secondary windings. The diodes are electrically connected between the secondary windings and the output terminals to generate the output voltages, respectively.

Another exemplary embodiment of a display device includes an e-paper device and a power converter. The e-paper device displays information. The power converter generates a plurality of output voltages respectively at a plurality of output terminals and provides the output voltages to the e-paper device. The power converter includes a transformer, at least one first diode, and at least one second diode. The transformer has a primary winding and at least one secondary winding. The first diode is electrically connected between the primary winding and one of the output terminals for generating the corresponding output voltage. The second diode is electrically connected between the at least one secondary winding and one of the output terminals to generate the corresponding output voltage.

An exemplary embodiment of a power converter generates a plurality of output voltages and includes a plurality of output terminals, a transformer, at least one first diode, and at least one second diode. The output terminals respectively provide the output voltages. The transformer has a primary winding and at least one secondary winding. The first diode is electrically connected between the primary winding and one of the output terminals to generate the corresponding output voltage. The second diode is electrically connected between the at least one secondary winding and one of the output terminals to generate the corresponding output voltage.

Another exemplary embodiment of a display device comprises an e-paper device and a power converter. The e-paper device displays information. The power generates a plurality of output voltages respectively at a plurality of output terminals and provides the output voltages to the e-paper device. The power converter comprises a coupled-inductor, a first diode, and a second diode. The coupled-inductor has a first winding and a second winding. The first winding and the second winding are electrically connected in series between a first node and a second node. The first diode is electrically connected between a joint of the first winding and the second winding and one of the output terminals to generate the corresponding output voltage. The second diode is electrically connected between the second node and one of the output terminals to generate the corresponding output voltage.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 3:
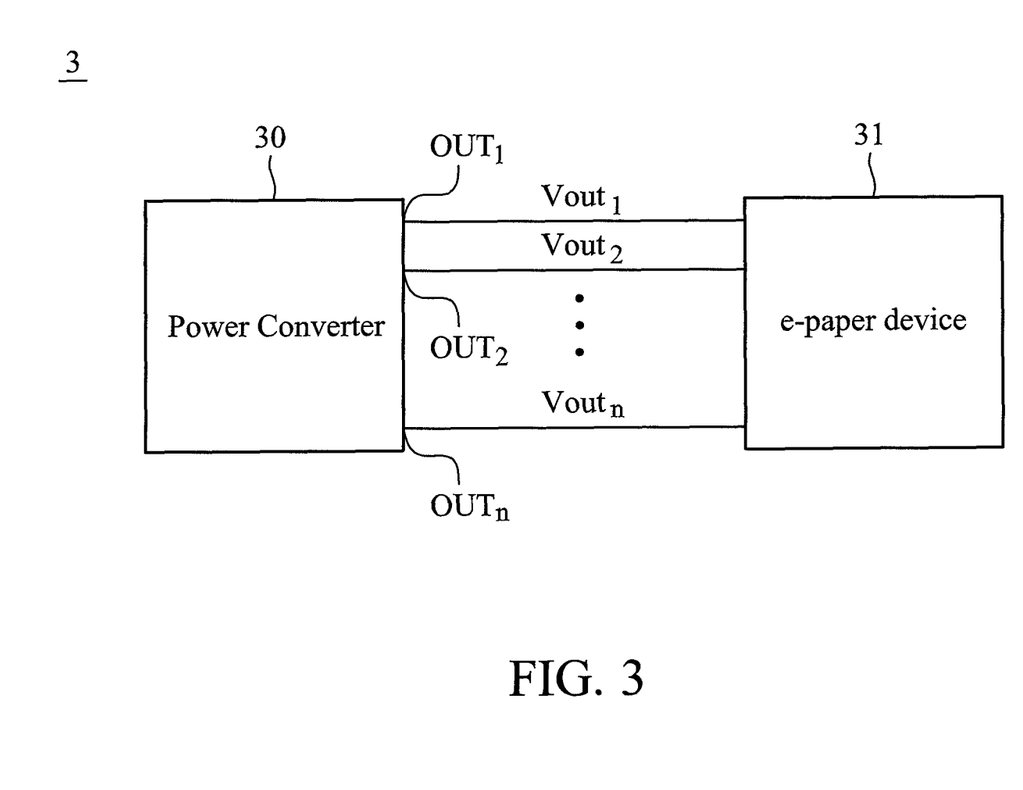
FIG. 3 shows an exemplary embodiment of a display device.
Figure 4:
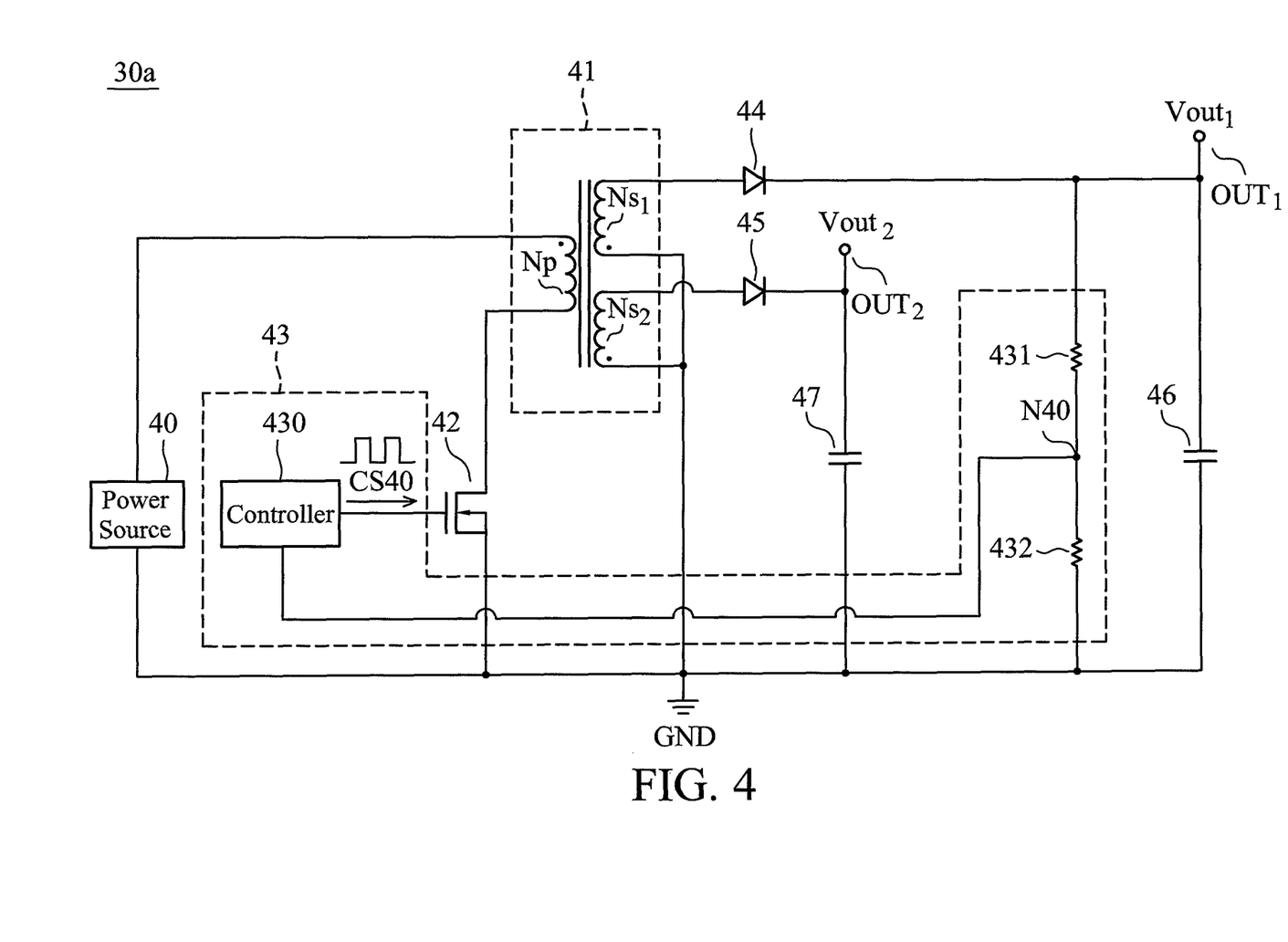
FIG. 4 shows an exemplary embodiment of the power converter in FIG. 3.

FIG. 3 shows an exemplary embodiment of a display device. Referring to FIG. 3, a display device 3 includes a power converter 30 and an e-paper device 31. The e-paper device 31 is used to display information. The power converter 30 provides a plurality of output voltages $Vout_1 \sim Vout_n$ respectively through output terminals $OUT_1 \sim OUT_n$ to drive the e-paper device 31, wherein n is a positive integer. FIG. 4 shows an exemplary embodiment of the power converter 30 in FIG. 3. In the embodiment of FIG. 4, a power converter 30a providing two output voltages is given as an example, that is n is equal to 2 (n=2). Referring to FIG. 4, the power converter 30a includes a power source 40, a transformer 41, a switch 42, a control unit 43, diodes 44 and 45, and capacitors 46 and 47. The power converter 30a generates two output voltages $Vout_1$ and $Vout_2$ respectively at the output terminals $OUT_1$ and $OUT_2$. The transformer 41 includes a primary winding Np. The transformer 41 further includes two secondary windings $Ns_1$ and $Ns_2$ which corresponds to the two output voltages $Vout_1$ and $Vout_2$ respectively. In other words, the number of the secondary windings is equal to the number of the output voltages. The power source 40 is electrically connected between a first terminal of the primary winding Np and a ground terminal GND. The switch 42 is electrically connected between a second terminal of the primary winding Np and the ground terminal GND and controlled by a pulse width modulation (PWM) control signal CS40. The switch 42 can be a normal switch has no need to suffer high voltage. Therefore, the cost of the normal switch 42 is lower than that of the high power switch 16 of FIG. 1. The output voltages can be tuned by adjusting the winding number of the primary winding and the winding number of the secondary winding. The control unit 43 is electrically connected to at least one of the output terminals $OUT_1$ and $OUT_2$ to detect the corresponding output voltage and adjust the duty cycle of the PWM control signal CS40 according to the corresponding output voltage.

In the embodiment of FIG. 4, the control unit 43 is electrically connected to the output terminal $OUT_1$ to detect the output voltage $Vout_1$. As shown in FIG. 4, the control unit 43 includes a controller 430 and resistors 431 and 432. The resistors 431 and 432 are electrically connected in series between the output terminal $OUT_1$ and the ground terminal GND. An attenuated voltage of the output voltage $Vout_1$ is obtained at a joint N40 between the resistors 431 and 432. The controller 430 receives the attenuated voltage and detects the output voltage $Vout_1$ through the obtainment of the attenuated voltage. Accordingly, the controller 430 adjusts the duty cycle of the PWM control signal CS40 according to the corresponding output voltage.

Each of the secondary windings $Ns_1$ and $Ns_2$ has a first terminal and a second terminal. The diode 44 is electrically connected between the first terminal of the secondary winding $Ns_1$ and the output terminal $OUT_1$. The second terminal of the secondary winding $Ns_1$ is electrically connected to the ground terminal GND. The diode 45 is electrically connected between the first terminal of the secondary winding $Ns_2$ and the output terminal $OUT_2$. The second terminal of the secondary winding $Ns_2$ is electrically connected to the ground terminal GND. The capacitor 46 is electrically connected to the output terminal $OUT_1$ and the ground terminal GND, and the capacitor 47 is electrically connected to the output terminal $OUT_2$ and the ground terminal GND. The generation of the output voltages $Vout_1$ and $Vout_2$ will be described in following.

Referring to FIG. 4, when the switch 42 is turned on according to the high state of the PWM control signal CS40, the transformer 41 stores energy with current flowing through the primary winding Np. When the switch 42 is turned off according to the low state of the PWM control signal CS40, the transformer 41 releases the stored energy through the secondary windings $Ns_1$ and $Ns_2$. The diodes 44 and 45 are biased in the forward direction. Through the storing and releasing of the energy by the transformer 41, the output voltages $Vout_1$ and $Vout_2$ are generated at the output terminals $OUT_1$ and $OUT_2$ respectively.

According to the above embodiment of FIG. 4, the power converter 30a can provide a plurality of output voltages. Since only one switch 42 is used, power loss due to the only one switch 42 and the only one controller 430 is not increased with the number of output voltages. Moreover, only one switch 42 and only one control unit 43 are used to generate a plurality of output voltages. Therefore, the power converter 30a does not occupy a large area.

In the embodiment of FIG. 4, the control unit 43 is electrically connected to the output terminal $OUT_1$ to detect the output voltage $Vout_1$. In some embodiments, the control unit 43 can be electrically connected to the output terminal $OUT_2$ to detect the output voltage $Vout_2$ instead of the output terminal $OUT_1$ and adjusts the PWM control signal CS40 according to the output voltage $Vout_2$. In other some embodiments, the control unit 43 can be electrically connected to both of the output terminals $OUT_1$ and $OUT_2$ to detect the output voltages $Vout_1$ and $Vout_2$ instead of only the output terminal $OUT_1$ and adjust the PWM control signal CS40 according to the output voltages $Vout_1$ and $Vout_2$.

Figure 5:
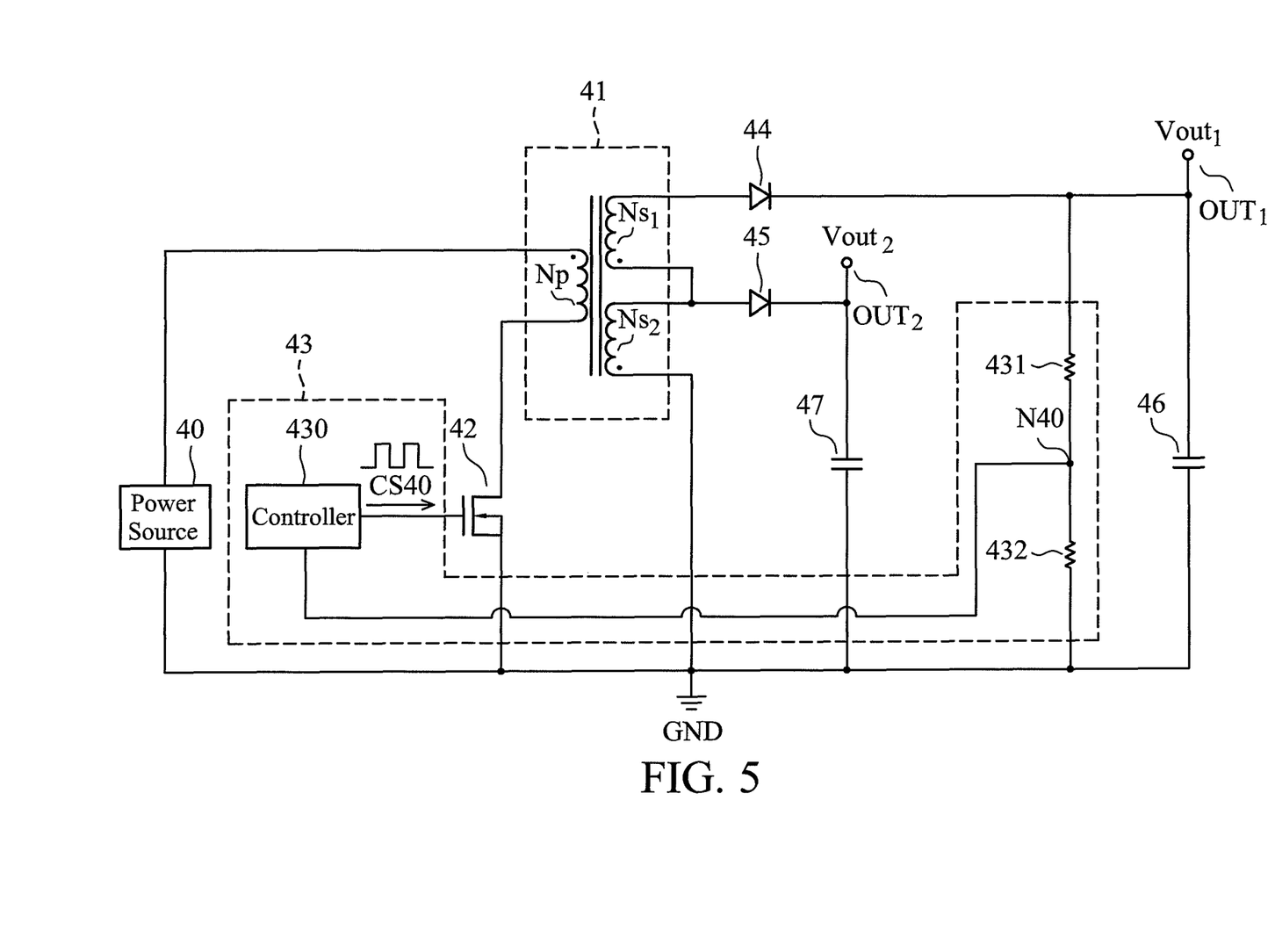
FIG. 5 shows a variation of the circuit connections of the power converter in FIG. 3.

In the embodiment of FIG. 4, the second terminal of the secondary winding $Ns_1$ is electrically connected to the ground terminal GND. In some embodiments, the second terminal of the secondary winding $Ns_1$ is electrically connected to the first terminal of the secondary winding $Ns_2$ instead of the ground terminal GND, as shown in FIG. 5, thus changing the turn ratio of the secondary windings $Ns_1$ and $Ns_2$. The connection between the secondary windings $Ns_1$ and $Ns_2$ can be implemented by any configuration known by one skilled in the art, wherein the turn ratio of the secondary windings $Ns_1$ and $Ns_2$ is changed in response to the implemented connection method.

Figure 6:
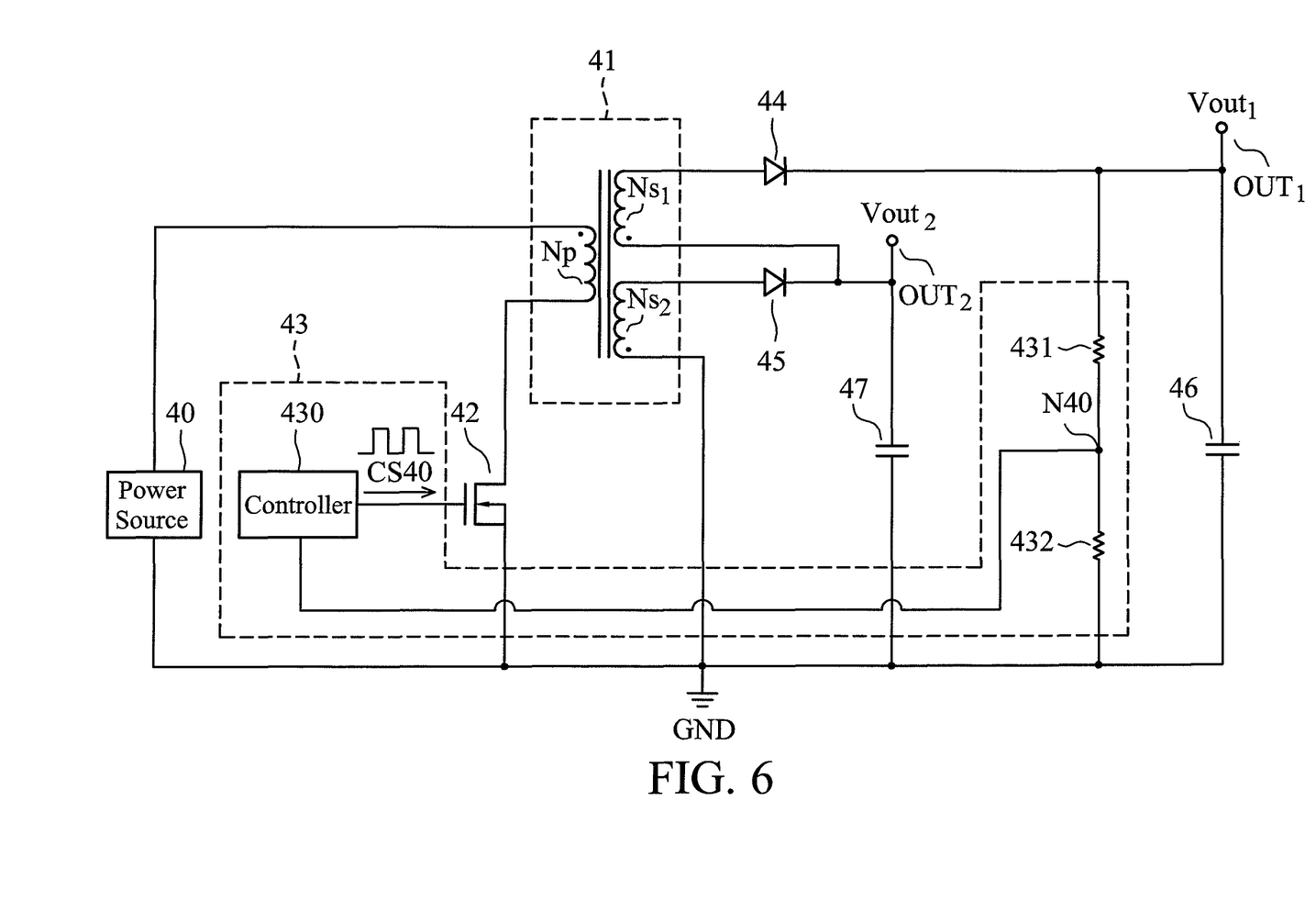
FIG. 6 shows another variation of the circuit connections of the power converter in FIG. 3.

In other some embodiments, the second terminal of the secondary winding $Ns_1$ is electrically connected to the output terminal $OUT_2$ instead of the ground terminal GND, as shown in FIG. 6. In the embodiment of FIG. 6, the diode 45 can be implemented by an element with degraded specification. For example, the diode 45 in FIG. 6 is a normal diode suffering a lower voltage instead of a high voltage diode. The cost of the normal diode is lower than that of the high voltage diode.

Figure 7:
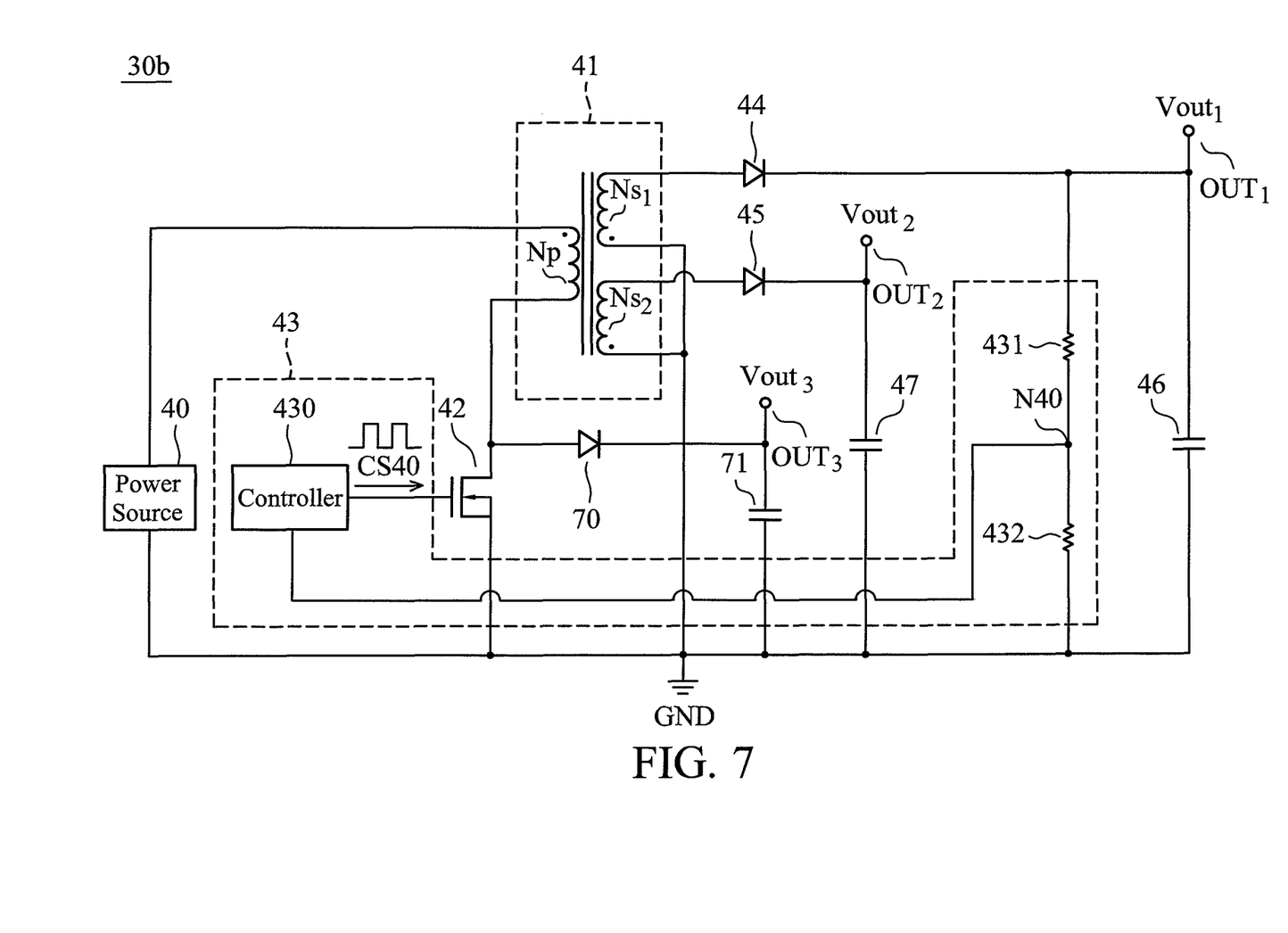
FIG. 7 shows another exemplary embodiment of a power converter in FIG. 3.

FIG. 7 shows another exemplary embodiment of a power converter 30 in FIG. 3. In the embodiment of FIG. 7, a power converter 30*b* providing three output voltages is given as an example, that is n is equal to 3 (n=3). Referring to FIG. 7, the circuitry of the power converter 30*b* is similar to that of the power converter 30*a* in FIG. 4. The difference between the power converters 30*a* and 30*b* is that the power converter 30*b* further includes a diode 70 and a capacitor 71. The diode 70 is electrically connected between the second terminal of the primary winding Np and an output terminal $OUT_3$. The capacitor 71 is electrically connected between the output terminal $OUT_3$ and the ground terminal GND. When the switch 42 is turned on by the high state of the PWM control signal CS40, the transformer 41 stores energy with current flowing through the primary winding Np. At this time, the diode 70 is turned off. When the switch 42 is turned off by the low state of the PWM control signal CS40, the transformer 41 releases energy, and the diode 70 is turned on and biased in the forward direction to generate the output voltage $Vout_3$ at the output terminal $OUT_3$. As described above, through the storing and releasing of the energy by the transformer 41, the output voltages $Vout_1$~$Vout_3$ are generated at the output terminals $OUT_1$~$OUT_3$ respectively.

According to the embodiment of FIG. 7, the power converter 30*b* can provide a plurality of output voltages. Among the output voltages, at least one output voltage is generated through the diode 70 which is electrically connected to the second terminal of the primary winding Np.

In the embodiment of FIG. 7, the second terminal of the secondary winding $Ns_1$ can be electrically connected to the first terminal of the secondary winding $Ns_2$ as shown in FIG. 5 or to the output terminal $OUT_2$ as shown in FIG. 6.

Figure 8:
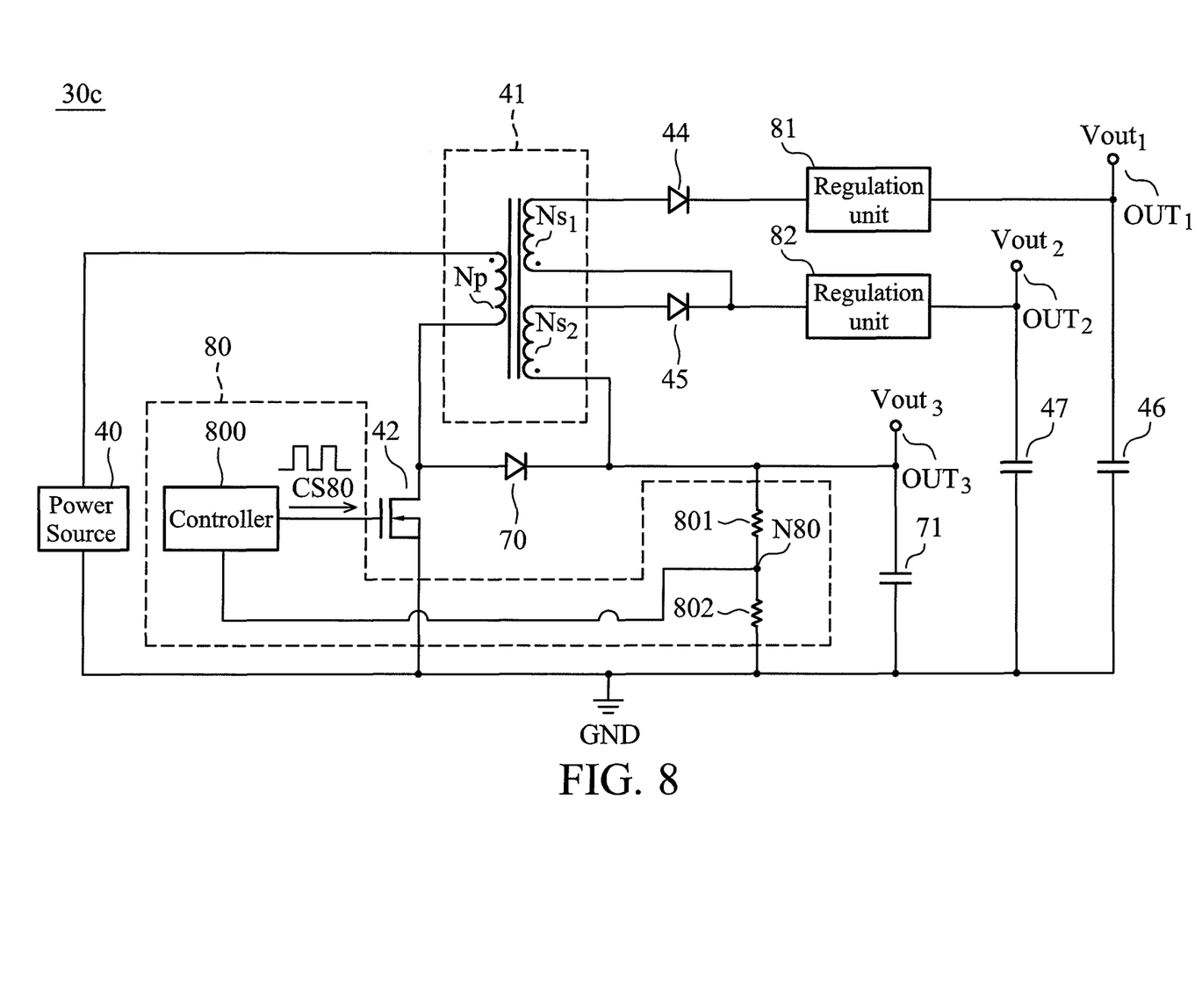
FIG. 8 shows another exemplary embodiment of a power converter in FIG. 3.

FIG. 8 shows another exemplary embodiment of a power converter 30 in FIG. 3. In the embodiment of FIG. 8, a power converter 30*c* providing three output voltages is given as an example, that is n is equal to 3 (n=3). Referring to FIG. 8, the circuitry of the power converter 30*c* is similar to that of the power converter 30*b* in FIG. 7. The difference between the power converters 30*b* and 30*c* is that the power converter 30*c* does not includes the control unit 43 but further includes a control unit 80 and regulation units 81 and 82. The control unit 80 generates a PWM control signal CS80 to control the switch 42 instead of the control PWM control signal CS40 of FIG. 7. The regulation unit 81 is electrically connected between the diode 44 and the output terminal $OUT_1$ to adjust the value of the output voltage $Vout_1$ to be more accurate. The regulation unit 82 is electrically connected between the diode 45 and the output terminal $OUT_2$ to adjust the value of the output voltage $Vout_2$ to be more accurate. The further different between the power converters 30*b* and 30*c* is that the second terminal of the secondary winding $Ns_1$ is electrically connected to the output terminal $OUT_2$ through the regulation unit 82 instead of the ground terminal GND, similar to the coupling relationship between the secondary wining $N_{s1}$ and the diode 45 shown in FIG. 6. Moreover, the second terminal of the winding $Ns_2$ is electrically connected to the output terminal $OUT_3$ instead of the ground terminal GND. According to the connection structures between the primary winding $N_P$, the secondary windings $N_{S1}$ and $N_{S2}$, and the diodes 44, 45, and 70 as shown in FIG. 8, the primary winding Np and the secondary windings $N_{S1}$ and $N_{S2}$ are electrically connected in series through the diodes 40, 45, and 70. Accordingly, the output voltage $Vout_1$ can have a larger value, however, without a greater winding ratio of the transformer 41, resulting in the area of the power converter 30*c* is saved. Further, the inverse bias voltages of the diodes 40, 45, and 70 are effectively decreased. Thus, according to the embodiment of FIG. 8, the power converter 30*c* having a smaller area and high efficiency can be applied to portable devices with batteries or apparatuses with need of high voltages.

The control unit 80 does not detect the output voltage $Vout_1$, but the control unit 80 is used to detect the output voltage $Vout_3$ instead. As shown in FIG. 8, the control unit 80 includes a controller 800 and resistors 801 and 802. The resistors 801 and 802 are electrically connected in series between the output terminal $OUT_3$ and the ground terminal GND. An attenuated voltage of the output voltage $Vout_3$ is obtained at a joint N80 of the resistors 801 and 802. The controller 800 receives the attenuated voltage and detects the output voltage $Vout_3$ through the obtainment of the attenuated voltage. Accordingly, the controller 800 adjusts the duty cycle of the PWM control signal CS40 according to the output voltage $Vout_3$.

In the embodiment of FIG. 8, the second terminal of the secondary winding $Ns_1$ can be electrically connected to the first terminal of the secondary winding $Ns_2$ as shown in FIG. 5 or to the output terminal $OUT_2$ as shown in FIG. 6.

Figure 9:
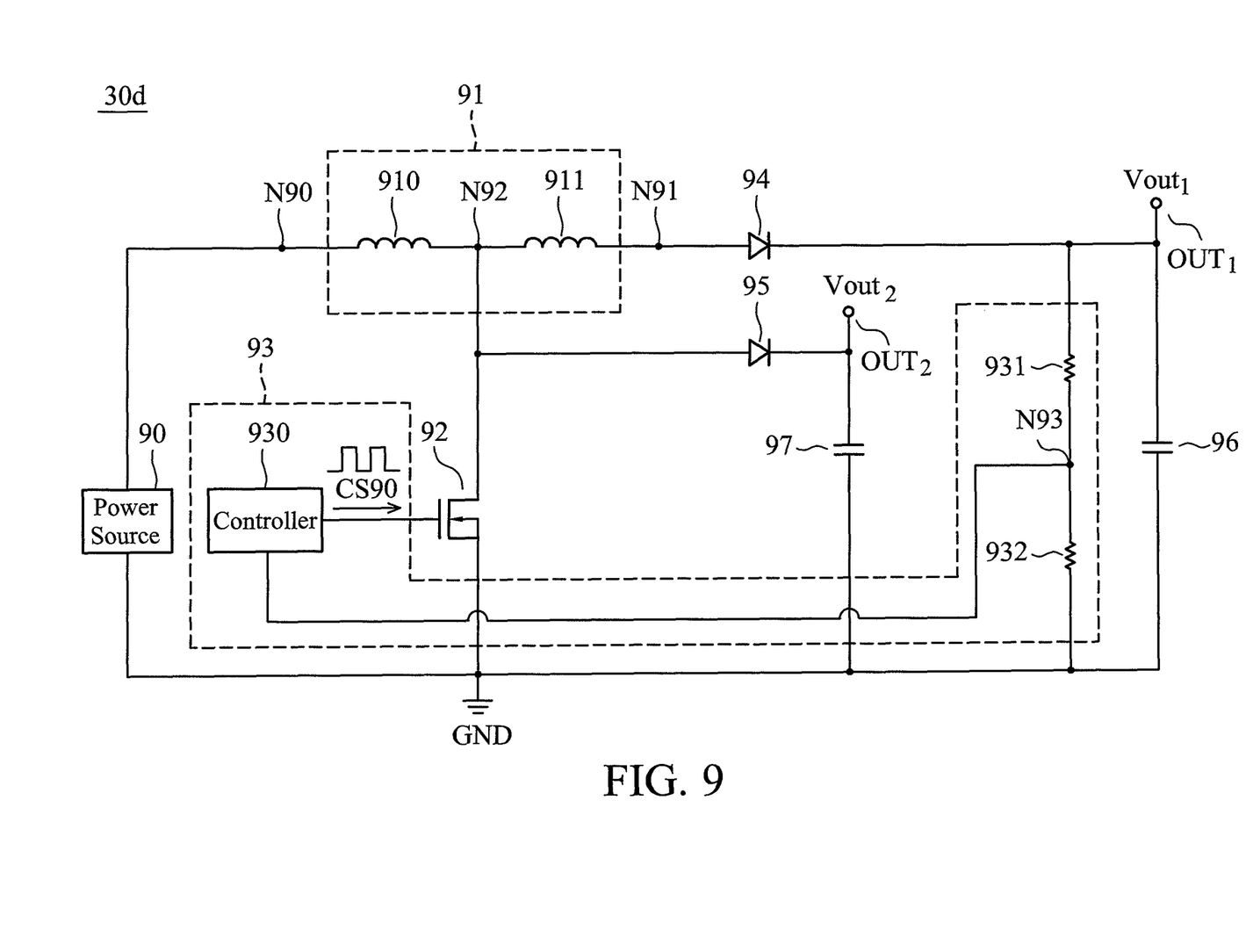
FIG. 9 shows another exemplary embodiment of a power converter in FIG. 3.

FIG. 9 shows another exemplary embodiment of a power converter 30 in FIG. 3. In the embodiment of FIG. 9, a power converter 30*d* providing two output voltages is given as an example, that is n is equal to 2 (n=2). Referring to FIG. 9, the power converter 30*d* includes a power source 90, a coupled-inductor 91, a switch 92, a control unit 93, diodes 94 and 95, and capacitors 96 and 97. The power converter 30*d* generates two output voltages $Vout_1$ and $Vout_2$ respectively at output terminals $OUT_1$ and $OUT_2$. The coupled-inductor 91 has windings 910 and 911 which are electrically connected in series between nodes N90 and N91. The joint of the windings 910 and 911 is node N92. The power source 90 is electrically connected between the node N90 and a ground terminal GND. The switch 92 is electrically connected between the joint N92 and the ground terminal GND and controlled by a pulse width modulation (PWM) control signal CS90. The control unit 93 is electrically connected to at least one of the output terminals $OUT_1$ and $OUT_2$ to detect the corresponding output voltage and adjust the duty cycle of the PWM control signal CS90 according to the corresponding output voltage.

In the embodiment of FIG. 9, the control unit 93 is electrically connected to the output terminal $OUT_1$ to detect the output voltage $Vout_1$. As shown in FIG. 9, the control unit 93 includes a controller 930 and resistors 931 and 932. The resistors 931 and 932 are electrically connected in series between the output terminal $OUT_1$ and the ground terminal GND. An attenuated voltage of the output voltage $Vout_1$ is obtained at a joint N93 of the resistors 931 and 932. The controller 930 receives the attenuated voltage and detects the output voltage $Vout_1$ through the obtainment of the attenuated voltage. Accordingly, the controller 930 adjusts the duty cycle of the PWM control signal CS90 according to the output voltage $Vout_1$.

The diode 94 is electrically connected between the node N91 and the output terminal $OUT_1$. The diode 95 is electrically connected between the joint N92 and the output terminal $OUT_2$. The capacitor 96 is electrically connected to the output terminal $OUT_1$ and the ground terminal GND, and the capacitor 97 is electrically connected to the output terminal $OUT_2$ and the ground terminal GND. The generation of the output voltages $Vout_1$ and $Vout_2$ will be described in following.

Referring to FIG. 9, when the switch 92 is turned on by the high state of the PWM control signal CS90, the power source 90, the winding 910 of the coupled-inductor 91, and the switch 92 form a loop. The winding 910 of the coupled-inductor 91 stores energy with current flowing through the loop, and, at this time, the diode 95 is turned off. When the switch 92 is turned off by the low state of the PWM control signal CS90, the winding 910 releases the stored energy through the winding 911. The diodes 94 and 95 are biased in the forward direction to respectively generate the output $Vout_1$ at the output terminal $OUT_1$ and the output $Vout_2$ at the output terminal $OUT_2$.

According to the above embodiment of FIG. 9, the power converter 30d can provide a plurality of output voltages. Since only one switch 92 is used, power loss due to the only one switch 92 and the only one controller 930 is not increased with the number of the output voltages. Moreover, only one switch 92 and only one control unit 93 are used to generate a plurality of output voltages. Therefore, the power converter 30d does not occupy a large area.

In the embodiment of FIG. 9, the control unit 93 is electrically connected to the output terminal $OUT_1$ to detect the output voltage $Vout_1$. In some embodiments, the control unit 93 can be electrically connected to the output terminal $OUT_2$ to detect the output voltage $Vout_2$ instead of the output terminal $OUT_1$ and adjust the duty cycle of the PWM control signal CS90 according to the detection result. In other some embodiments, the control unit 93 can be electrically connected to both of the output terminals $OUT_1$ and $OUT_2$ to detect the output voltages $Vout_1$ and $Vout_2$ instead of only the output terminal $OUT_1$ and adjust the PWM control signal CS90 according to the detection result.

While the invention has been described by way of example and in terms of the preferred embodiments, it is to be understood that the invention is not limited to the disclosed embodiments. To the contrary, it is intended to cover various modifications and similar arrangements (as would be, apparent to those skilled in the art). Therefore, the scope of the appended claims should be accorded the broadest interpretation so as to encompass all such modifications and similar arrangements.

What is claimed is:

1. A display device comprising:
an e-paper device for displaying information; and
a power converter for generating a plurality of output voltages respectively at a plurality of output terminals and providing the output voltages to the e-paper device, wherein the power converter comprises:
a transformer having a primary winding, at least one first secondary winding, and a second secondary winding;
at least one first diode electrically connected between the primary winding and a first output terminal among the output terminals for generating the corresponding output voltage;
at least one second diode electrically connected between a first terminal of the at least one first secondary winding and a second output terminal among the output terminals for generating the corresponding output voltage;
a third diode having an anode terminal coupled to the second secondary winding and a cathode terminal coupled to a third output terminal among the output terminals, wherein a first terminal of the second secondary winding is directly connected to the anode terminal of the third diode, and a second terminal of the at least one first secondary winding is directly connected to the cathode terminal of the third diode;
a control unit for detecting the output voltage at the first output terminal and providing a control signal according to the detected output voltage, and
wherein the at least one first diode has an anode terminal coupled to the primary winding and a cathode terminal coupled to the first output terminal, and the second terminal of the second secondary winding is directly connected to the cathode terminal of the at least one first diode.

2. The display device as claimed in claim 1, wherein the power converter further comprises:
a power source electrically connected between a first terminal of the primary winding and a ground terminal; and
a switch electrically connected between a second terminal of the primary winding and the ground terminal and controlled by the control signal.

3. The display device as claimed in claim 1, wherein the control signal is a pulse width modulation (PWM) signal.

4. The display device as claimed in claim 1, wherein the power converter further comprises at least one regulation unit electrically connected between the at least one second diode and the second output terminal for regulating the corresponding output voltage.

5. The display device as claimed in claim 1, wherein the control unit comprises:
a first resistor coupled between the first output terminal and a joint;
a second resistor coupled between the joint and a ground terminal; and
a controller, coupled to the joint, for generating the control signal.

6. A power converter for generating a plurality of output voltages comprising:
a plurality of output terminals for respectively providing the output voltages;
a transformer having a primary winding, at least one first secondary winding, and a second secondary winding;
at least one first diode electrically connected between the primary winding and a first output terminal among the output terminals for generating the corresponding output voltage; and
at least one second diode electrically connected between a first terminal of the at least one first secondary winding and a second output terminal among the output terminals for generating the corresponding output voltage;
a third diode having an anode terminal coupled to the second secondary winding and a cathode terminal coupled to a third output terminal among the output terminals, wherein a first terminal of the second secondary winding is directly connected to the anode terminal of the third diode, and a second terminal of the at least one first secondary winding is directly connected to the cathode terminal of the third diode;

a control unit for detecting the output voltage at the first output terminal and providing a control signal according to the detected output voltage, and wherein the at least one first diode has an anode terminal coupled to the primary winding and a cathode terminal coupled to the first output terminal, and the second terminal of the second secondary winding is directly connected to the cathode terminal of the at least one first diode.

7. The power converter as claimed in claim 6 further comprising:

a power source electrically connected between a first terminal of the primary winding and a ground terminal; and a switch electrically connected between a second terminal of the primary winding and the ground terminal and controlled by the control signal.

8. The power converter as claimed in claim 6, wherein the control signal is a pulse width modulation (PWM) signal.

9. The power converter as claimed in claim 6 further comprising at least one regulation unit electrically connected between the at least one second diode and the second output terminal for regulating the corresponding output voltage.

10. The power converter as claimed in claim 6, wherein the control unit comprises:

a first resistor coupled between the first output terminal and a joint;

a second resistor coupled between the joint and a ground terminal; and a controller, coupled to the joint, for generating the control signal.

\* \* \* \* \*